US012725787B2

(12) United States Patent
Badar et al.

(10) Patent No.: US 12,725,787 B2
(45) Date of Patent: Sep. 1, 2026

(54) SECONDARY-BATTERY NEGATIVE ELECTRODE, METHOD FOR MANUFACTURING SAME, AND SECONDARY BATTERY

(71) Applicant: Panasonic Intellectual Property Management Co., Ltd., Osaka (JP)

(72) Inventors: Saifullah Badar, Osaka Fu (JP); Takuji Tsujita, Osaka Fu (JP); Keisuke Asaka, Osaka Fu (JP); Hirotetsu Suzuki, Osaka Fu (JP); Motohiro Sakata, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 929 days.

(21) Appl. No.: 17/801,934

(22) PCT Filed: Feb. 25, 2021

(86) PCT No.: PCT/JP2021/007141
§ 371 (c)(1),
(2) Date: Aug. 24, 2022

(87) PCT Pub. No.: WO2021/172443
PCT Pub. Date: Sep. 2, 2021

(65) Prior Publication Data

US 2023/0078924 A1 Mar. 16, 2023

(30) Foreign Application Priority Data

Feb. 28, 2020 (JP) ................................ 2020-034475

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/364* (2013.01);
(Continued)

(58) Field of Classification Search
CPC ........................ H01M 2004/027; H01M 4/366
See application file for complete search history.

(56) References Cited

U.S. PATENT DOCUMENTS 5,861,457 A * 1/1999 Weidner ................ C08G 77/06
524/588
2004/0106040 A1* 6/2004 Fukuoka ................ H01M 4/13
429/232
(Continued)

FOREIGN PATENT DOCUMENTS

CN 105993088 A 10/2016
JP 2006-49266 A 2/2006
(Continued)

OTHER PUBLICATIONS

Deep Sea evidentiary reference (Year: 2024).*
(Continued)

*Primary Examiner* — Jennifer Dieterle
(74) *Attorney, Agent, or Firm* — WHDA, LLP

(57) ABSTRACT

A negative electrode for a secondary battery includes a negative electrode mixture layer having a negative electrode active material, a first layer covering at least a portion of a surface of the negative electrode active material, and a second layer covering at least a portion of a surface of the first layer, wherein the first layer includes a carbon material, and the second layer includes silicone.

14 Claims, 7 Drawing Sheets

(51) Int. Cl.
*H01M 4/587* (2010.01)
*H01M 4/62* (2006.01)
*H01M 4/02* (2006.01)

(52) U.S. Cl.
CPC ............. *H01M 4/587* (2013.01); *H01M 4/62* (2013.01); *H01M 2004/021* (2013.01); *H01M 2004/027* (2013.01)

(56) References Cited

U.S. PATENT DOCUMENTS

2006/0008706 A1* 1/2006 Yamaguchi ........... H01M 4/134 429/313
2006/0134516 A1* 6/2006 Im ..................... H01M 10/0525 429/232
2010/0248026 A1 9/2010 Hinoki et al.
2013/0078516 A1* 3/2013 Taniguchi ............. H01M 4/386 429/213
2016/0111700 A1* 4/2016 Ikenuma ................ H01G 11/06 429/126
2017/0012283 A1 1/2017 Mizuno et al.

FOREIGN PATENT DOCUMENTS

| | | | |
|---|---|---|---|
| JP | 2010-225561 | A | 10/2010 |
| JP | 2010-272477 | A | 12/2010 |
| JP | 2011-14298 | A | 1/2011 |
| JP | 2013-69531 | A | 4/2013 |
| JP | 2016-81922 | A | 5/2016 |
| WO | 2013/024639 | A1 | 2/2013 |

OTHER PUBLICATIONS

Office Action dated Oct. 18, 2024, issued in counterpart CN Application No. 202180016886.7, with partial English translation. (12 pages).

International Search Report dated May 18, 2021, issued in counterpart International Application No. PCT/JP2021/007141 (3 pages).

* cited by examiner

70mm
20
30mm
40mm
60mm 2b
2a (20)

6
2b
2c
2a (20)

SECONDARY-BATTERY NEGATIVE ELECTRODE, METHOD FOR MANUFACTURING SAME, AND SECONDARY BATTERY

TECHNICAL FIELD

The present disclosure relates mainly to a negative electrode for a secondary battery and a method for producing the same.

BACKGROUND ART

Nonaqueous electrolyte secondary batteries, particularly lithium ion secondary batteries, are expected as a power source for small consumer applications, power storage devices, and electric vehicles, because of their high voltage and high energy density. With a demand for a high-energy density in batteries, as a negative electrode active material having a high theoretical capacity density, use of a silicon (silicon (Si))-containing material capable of being alloyed with lithium is expected.

Patent Literature 1 teaches an electrode having a current collector and an active material layer, wherein the active material layer has an active material, a silicone-containing film, a conductive assistant, and a binder, and the active material is in a particle form, and the silicone-containing film covers at least a portion of the active material. Also taught is an electrode production method, of forming a mixture liquid having an active material, silicone, and a first solvent; forming an active material having a coating by spraying the mixture liquid from a nozzle and volatilizing the first solvent; forming a paste having the active material with the coating, a conductive assistant, a binder, and a second solvent; and forming an active material layer by applying the paste on the current collector and volatilizing the second solvent.

CITATION LIST

Patent Literature

Patent Literature 1: Japanese Laid-open Patent Publication No. 2016-81922

SUMMARY OF INVENTION

Patent Literature 1 aims to provide an electrode and a production method thereof, with which decomposition reaction of electrolytes caused as a side reaction of charge/discharge is minimized, and cycle characteristics are improved. However, with the proposal of Patent Literature 1, it is difficult to stably improve the capacity retention rate in charge/discharge cycle.

In view of the above, an aspect of the present disclosure relates to a negative electrode for a secondary battery including a negative electrode mixture layer having a negative electrode active material, a first layer covering at least a portion of a surface of the negative electrode active material, a second layer covering at least a portion of a surface of the first layer, and the first layer includes a carbon material, and the second layer includes silicone.

Another aspect of the present disclosure relates to a method for producing a negative electrode for a secondary battery; the method including, preparing a slurry including a negative electrode active material, a first layer covering at least a portion of a surface of the negative electrode active material, and a dispersion medium, wherein the first layer includes a carbon material; applying the slurry on a negative electrode current collector, and volatilizing the dispersion medium, thereby forming a coating; preparing a solution including silicone and a solvent; allowing the coating to contact the solution and volatilizing the solvent, to cover at least a portion of a surface of the first layer with a second layer, wherein the second layer includes the silicone.

Still another aspect of the present disclosure relates to a secondary battery including the above-described negative electrode for a secondary battery, a positive electrode, and an electrolyte.

The present disclosure allows for stable improvement in the capacity retention rate in charge/discharge cycle of secondary batteries.

DESCRIPTION OF EMBODIMENTS

Figure 1A:
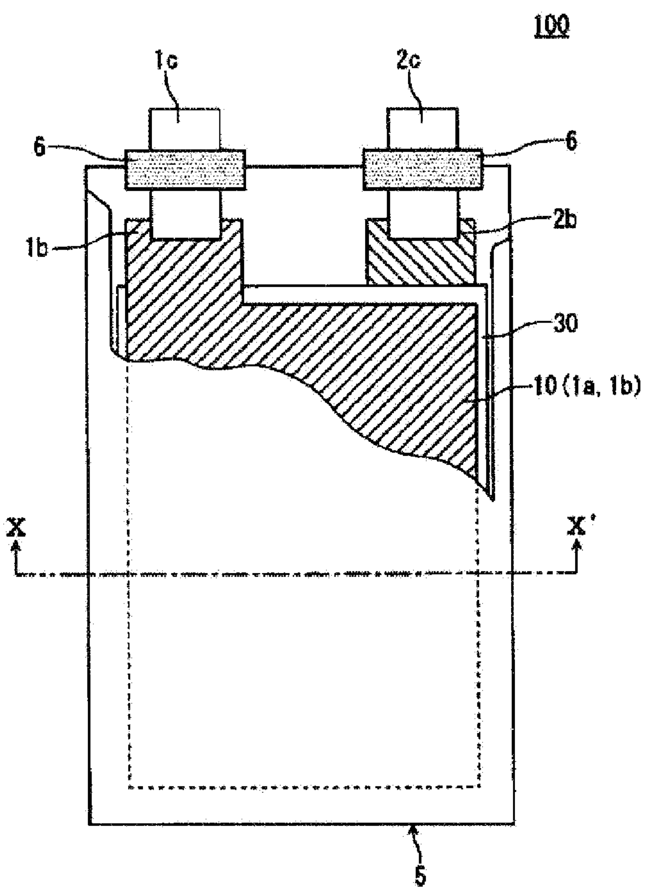
FIG. 1A is a partially cutaway plan view schematically showing a structure of a nonaqueous electrolyte secondary battery of an embodiment of the present disclosure.

A negative electrode for a secondary battery of the embodiment of the present disclosure includes, for example, a negative electrode mixture layer formed on a negative electrode current collector, and the negative electrode mixture layer has a negative electrode active material, a first layer covering at least a portion of a surface of the negative electrode active material, and a second layer covering at least a portion of a surface of the first layer. The first layer includes a carbon material, and the second layer includes silicone. That is, the first layer is a base layer, and the second layer covers at least a portion of a surface of the negative electrode active material on the first layer. The negative electrode active material is a material generally in a state of particles. In this case, the surface of the negative electrode active material means a surface of the negative electrode active material particles.

The first layer covering a portion of the surface of the negative electrode active material will suffice, but it may cover the entire surface of the negative electrode active material. When the first layer covers only a portion of the negative electrode active material surface, the second layer may cover at least a portion of a surface of the negative electrode active material that is not covered by the first layer along with the surface of the first layer.

The carbon material (hereinafter, may also be referred to as first carbon material) forming the first layer has electrical conductivity, and imparts electrical conductivity to the negative electrode active material, or increases electrical conductivity of the negative electrode active material. Furthermore, the first layer suppresses side reactions caused by contacts between the electrolyte and the negative electrode active material. The first carbon material may have a graphite structure, or may be a noncrystalline carbon.

The first carbon material preferably covers at least a portion of a surface of the negative electrode active material like a coating, in view of achieving excellent electrical conductivity and highly effective suppression effects of side reactions. When a first layer like a coating is formed, a noncrystalline carbon is more preferable. The first carbon material may be used singly, or a plurality of types thereof may be used in combination.

The second layer including silicone will suffice, but it may include silicone and a material other than silicone. For example, the second layer may include silicone and a carbon material. In this case, the interface between the first layer and the second layer does not have to be clearly distinguishable. For example, in an analysis in a predetermined depth direction, the amount of silicone detected may decrease as it goes deeper from the second layer surface, and the first layer substantially composed of a carbon material may be detected as it goes still deeper. The silicone forming the second layer suppresses side reactions caused by contacts between the electrolyte and the negative electrode active material. In particular, it is highly durable against HF, i.e., an impurity produced in electrolytes. Furthermore, silicone has excellent affinity with the first carbon material, and is suitable for covering the first layer. Silicone is also suitable for forming a second layer in a coating form.

Silicone means a polymer or an oligomer having a main chain including at least one (preferably plural) siloxane bond (that is, Si—O—Si bond). Silicone may have a linear, branched, or cyclic structure. Silicone may have at least one side chain, or may have a functional group at at least one terminal. The types of silicone is not particularly limited, and it may be, for example, silicone resin, silicone oil, silicone rubber, silicone gel, silicone grease, etc. The silicone may be used singly, or a plurality of types thereof may be used in combination.

The negative electrode active material goes through relatively significant expansion and contraction along with charge/discharge, and therefore supposedly, just by covering the surface of the negative electrode active material with the first carbon material, the first carbon material easily detaches from the negative electrode active material surface. Furthermore, supposedly, even if the negative electrode active material surface is covered with the first carbon material on the layer including silicone after forming the base layer including silicone, the first carbon material easily detaches from the negative electrode active material surface. As the detachment of the first carbon material progresses, the conductive path in the negative electrode mixture layer deteriorates. Also, side reactions between the negative electrode active material and the electrolyte are accelerated. As a result, the capacity retention rate decreases.

Meanwhile, as the present disclosure proposes, when at least a portion of a surface of the negative electrode active material is covered with the first layer including the first carbon material, and at least a portion of a surface of the first layer is covered with the second layer including silicone, the detachment of the first layer is significantly suppressed. That is, deterioration of the conductive path in the negative electrode mixture layer is reduced, side reactions between the negative electrode active material and the electrolyte are suppressed, and reduction in the capacity retention rate is suppressed. That is, the second layer including silicone not only suppresses the side reactions between the electrolyte and the negative electrode active material, it also works to suppress detachment of the first layer. Furthermore, silicone has a high elasticity, and is stable against reversible elastic deformation, and therefore not easily damaged even the negative electrode active material repeatedly goes through expansion and contraction along with repetitive charge/discharge cycles. Furthermore, with the elasticity of silicone, it may work to press the first layer against the negative electrode active material surface.

The silicone can be represented by a general formula A:$\{(R1)_a SiO_{(4-a)/2}\}_c$. Here, R1 is a substituted or non-substituted organic group with a number of carbon atoms of 1 to 8. "a" is a rational number, c is an integer, and satisfies $0 \le a \le 2$ and $1 \le c$. The substituted or non-substituted organic group includes a hydrocarbon group having a substituent (or functional group) and a hydrocarbon group having no substituent (or functional group), etc. R1 is, specifically, at least one selected from the group consisting of an alkyl group, a vinyl group, an alkoxy group, an aryl group, an aryloxy group, a ketone group, a carboxyl group, and an ester group.

The silicone preferably has a hydrophobic group. The hydrophobic group has excellent affinity with the first carbon material, and therefore bonding force between the first layer and the second layer improves. Furthermore, the hydrophobic group suppresses impurities such as HF in electrolytes and approaching of the polar solvents to the negative electrode active material, and therefore side reactions can be further decreased.

Preferable examples of the hydrophobic group are an alkyl group, alkoxy group, aryl group, aryloxy group, ketone group, ester group, and the like. The aryl group (Ar) forms a Ar—Si bond. The alkyl group (Alk) forms a Alk-Si bond. The aryloxy group (Ar—O) forms a Ar—O—Si bond. The alkoxy group (Alk-O) forms a Alk-O—Si bond. The ketone group (Alk-CO-Alk) forms a Si-Alk-CO-Alk or Si—CO-Alk bond. The ester group (Alk-CO-OAlk) forms a Si-Alk-CO-OAlk or Alk-CO—O—Si bond.

Examples of the aryl group include a phenyl group, benzyl group, and toluyl group. Examples of the alkyl group include an alkyl group with a number of carbon atoms of 1 to 8. Examples of the aryloxy group include a phenoxy group. Examples of the alkoxy group include an oxy alkyl group with a number of carbon atoms of 1 to 8. Examples of the ester group include a condensation group of an alcohol with a number of carbon atoms of 1 to 8 and carboxylic acid with a number of carbon atoms of 1 to 8. In particular, the phenyl group, methyl group, and ethyl group easily increase adherence based on hydrophobic interactions of the first layer and the second layer, and are low in resistance, and also highly effective in suppression of side reactions of electrolytes.

That is, in the general formula A, R1 may include at least one selected from the group consisting of an alkyl group, alkoxy group, aryl group, aryloxy group, ketone group, and ester group, each being hydrophobic. In particular, R1 is preferably an alkyl group, and of the alkyl groups, at least one selected from the group consisting of a methyl group and an ethyl group is preferable.

The weight-average molecular weight of the silicone (Mw) is, for example, 80 or more and 10000 or less, 80 or more and 1000 or less, 500 or more and 3000 or less, and 100 or more and 1000 or less.

The silicone may have at least one selected from the group consisting of a silanol group (Si—OH) and an alkoxysilyl group (Si—OR2). Here, R2 is a substituted or non-substituted organic group with a number of carbon atoms of 1 to 8. The substituted or non-substituted organic group include a hydrocarbon group having a substituent, and a hydrocarbon group having no substituent. R2 may include, for example, at least one selected from the group consisting of an alkyl group, alkoxy group, aryl group, aryloxy group, ketone group, and ester group. In particular, R2 is preferably an alkyl group, and of the alkyl groups, at least one selected from the group consisting of a methyl group and an ethyl group is preferable. The silanol group increases adherence based on, for example, hydrophilic interactions between the negative electrode active material having a hydrophilic group on its surface and the second layer. The first layer is interposed between the negative electrode active material and the second layer, but because the first layer does not necessarily cover the entire surface of the negative electrode active material, affinity between the negative electrode active material and the second layer is also important. The alkoxysilyl group may produce a silanol group when forming the second layer, and therefore similar hydrophilic interactions may be exhibited.

The silicone may have a crosslinked structure in which one silicon atom and two or more oxygen atoms are bonded. The silicone having such a crosslinked structure has high strength, and high bonding force with the first layer, and has excellent durability. The silicone may include a monooxy structure (hereinafter, also referred to as $R_3SiO$ unit) in which one Si atom and one O atom (excluding O in hydroxyl group) are bonded; a dioxy structure (hereinafter, also referred to as $R_2SiO_2$ unit) in which one Si atom and two O atoms (excluding O in hydroxyl group) are bonded; a trioxy structure (hereinafter, also referred to as $RSiO_3$ unit) in which one Si atom and three 0 atoms (excluding O in hydroxyl group) are bonded; and a tetraoxy structure (hereinafter, also referred to as $SiO_4$ unit) in which one Si atom and four 0 atoms (excluding O in hydroxyl group) are bonded.

In the all Si atoms contained in the molecule, the ratio of the $R_2SiO_2$ unit is the highest. Preferably, the ratio of $RSiO_3$ unit relative to $R2SiO_2$ unit contained in the molecule: $RSiO_3$ unit/$R_2SiO_2$ unit (hereinafter, also referred to as T/D ratio) is, for example, larger than 0 and 0.15 or more. It is considered that the higher the T/D ratio, the higher the strength of the second layer, the higher the bonding force between the second layer and the first layer, and the higher the durability of the second layer.

A preferable example of the silicone includes silicone having a poly dimethyl siloxane skeleton as a main chain. In the poly dimethyl siloxane skeleton, a portion of the methyl group may be substituted with a phenyl group and/or a hydroxyl group. Preferably, the silicon atom composing the main chain is partially $RSiO_3$ unit or $SiO_4$ unit, and has a branched structure.

The negative electrode active material includes, for example, a Si-containing material. The Si-containing material is a material that significantly goes through expansion and contraction along with charge/discharge. That is, while a high capacity can be expected for the Si-containing material, compared with other negative electrode active materials, it is disadvantageous in that it may induce side reactions, and may easily reduce the capacity retention rate in charge/discharge cycle. Meanwhile, when the surface of the Si-containing material is covered with the first layer, and further the Si-containing material surface is covered with the second layer including silicone through the first layer, the effects of suppressing side reactions become significant easily, and the above-described disadvantages can be largely reduced.

The Si-containing material content of the negative electrode mixture layer may be, for example, 1 mass % to 30 mass %. In this case, the Si-containing material can be used in combination with the negative electrode active material other than the Si-containing material. In this manner, changes in volume of the entire negative electrode mixture layer can be significantly eased. The Si-containing material content in the negative electrode mixture layer can be, for example, 15 mass % or less. The Si-containing material content in the negative electrode mixture layer can be 1 mass % or more and 15 mass % or less, or 5 mass % or more and 10 mass % or less.

Negative Electrode Active Material

In the following, the negative electrode active material is further described in detail. The negative electrode active material is a material contained in the negative electrode, and is a material capable of electrochemically storing and releasing lithium ions. Here, the negative electrode active material includes at least a Si-containing material.

The Si-containing material may include, for example, a lithium ion conductive phase and Si particles dispersed in the lithium ion conductive phase. For the lithium ion conductive phase, for example, at least one selected from the group consisting of a silicon oxide phase, a silicate phase, and a carbon phase can be used. A composite material of such a lithium ion conductive phase and Si particles is suitable for suppressing direct contact between the Si particles and electrolyte, and imparting a high capacity to the negative electrode. For the Si-containing material, for example, at least one selected from the group consisting of the following first composite material, second composite material, and third composite material can be used.

First Composite Material

The first composite material includes a silicon oxide phase and first Si particles dispersed in the silicon oxide phase. The first composite material is highly stable among the Si-containing materials, and is excellent in terms of a small volume change. The high stability is probably because the first Si particles dispersed in the silicon oxide phase have a small particle size, with which deep charging does not progress easily. The silicon oxide phase has relatively many sites that irreversibly trap lithium ions, and of the Si-containing materials, the irreversible capacity tends to be large. The first composite material may have an irreversible capacity larger than that of the second composite material. The trapping of the lithium ions by the silicon oxide phase is considered to increase stability of the structure of the first composite material, and also contribute to suppression of volume changes.

The first composite material can be produced by, for example, heating silicon oxide in a non-oxidizing atmosphere having an inert gas such as argon and the like, and performing disproportionation. In disproportionation, microcrystals of Si can be produced homogeneously in the silicon oxide phase. The Si particles produced by disproportionation have a small size, and for example, they have an average particle size of less than 100 nm, or in a range of 5 nm to 50 nm. The main component (e.g., 95 to 100 mass %) of the silicon oxide phase is silicon dioxide. That is, the first composite material may include a $SiO_2$ phase, and first Si particles dispersed in the $SiO_2$ phase. In this case, the first composite material can be represented by, as a whole, a general formula $SiO_x$. The range of value x may be $0<x<2$, preferably $0.9 \leq x \leq 1.1$, or $x=1$.

The first composite material has an average particle size of 1 to 20 μm, preferably 5 to 12 μm. In the above-described particle size range, stress caused by volume change in the Si-containing material involved with charge/discharge can be easily relieved, and excellent cycle characteristics can be easily achieved.

Second Composite Material

The second composite material includes a silicate phase, and second Si particles dispersed in the silicate phase. The silicate phase may include, for example, at least one selected from the group consisting of Group 1 element and Group 2 element of the long-form periodic table. Examples of Group 1 element and Group 2 element of the long-form periodic table include lithium (Li), potassium (K), sodium (Na), magnesium (Mg), calcium (Ca), strontium (Sr), barium (Ba), and the like. Other elements may include aluminum (Al), boron (B), lanthanum (La), phosphorus (P), zirconium (Zr), titanium (Ti), etc. In particular, the silicate phase containing lithium (hereinafter also referred to as lithium silicate phase) is preferable because of its small irreversible capacity and high initial charge/discharge efficiency. That is, the second composite material may include the lithium silicate phase, and second Si particles dispersed in the lithium silicate phase. The second composite material including the lithium silicate phase, and the second Si particles dispersed in the lithium silicate phase may also be referred to as LSX in the following.

The lithium silicate phase may be any oxide phase containing lithium (Li), silicon (Si), and oxygen (O), and may include other elements. The atomic ratio of O to Si in the lithium silicate phase: O/Si is, for example, larger than 2 and less than 4. In this case, it is advantageous in terms of stability and lithium ion conductivity. Preferably. O/Si is larger than 2 and less than 3. The atomic ratio of Li to Si in the lithium silicate phase: Li/Si is, for example, larger than 0 and less than 4. Examples of the elements other than Li, Si, and O that can be contained in the lithium silicate phase include iron (Fe), chromium (Cr), nickel (Ni), manganese (Mn), copper (Cu), molybdenum (Mo), zinc (Zn), aluminum (Al), etc.

The lithium silicate phase may have a composition represented by the formula: $Li_{2z}SiO_{2+z}$ $(0<z<2)$. In view of stability, workability, and lithium ion conductivity, etc., z preferably satisfies the relation of $0<z<1$, and $z=\frac{1}{2}$ is more preferable.

Third Composite Material

The third composite material includes a carbon phase, and third Si particles dispersed in the carbon phase (hereinafter, third composite material is also referred to as Si—C material). The carbon phase may be composed of, for example, a noncrystalline carbon. The noncrystalline carbon may be, for example, hard carbon, soft carbon, or something else. The noncrystalline carbon can be produced by, for example, sintering a carbon source in an inert atmosphere, and grinding the produced sintered product. The Si—C material can be produced by, for example, mixing the carbon source and Si particles, stirring the mixture in a mixer such as a ball mill while grinding, and thereafter, baking the mixture in an inert atmosphere. For the carbon source, for example, a saccharide such as carboxymethyl cellulose (CMC), polyvinylpyrrolidone, cellulose, sucrose, and the like, and water-soluble resin and the like can be used. When mixing the carbon source with the Si particles, for example, the carbon source and the Si particles can be dispersed in a dispersion medium such as alcohol.

The second Si particle content in the second composite material and the third Si particle content in the third composite material can be, each independently, for example, 40 wt % or more and 80 wt % or less. In this manner, a battery with a high capacity and improved cycle characteristics both can be easily achieved. Unlike the first composite material, whose production method is limited, in the second composite material and the third composite material, the second Si particle content and the third Si particle content can be randomly changed, and therefore a high capacity negative electrode can be easily designed. By using the first composite material in combination with the second and/or third composite material, and also by adjusting their distribution in the negative electrode mixture layer, even when the utilization rate of Si is high, excellent cycle characteristics and high capacity can be both achieved.

The second and third composite materials are excellent in that they have a small irreversible capacity. This is because the silicate phase and the carbon phase have less sites that trap lithium ions irreversibly. By using the second and/or third composite materials, excellent charge/discharge efficiency can be achieved. The effects are prominent particularly at the initial stage of charge/discharge.

The second and third Si particles have an average particle size of, each independently, for example, 500 nm or less, may be 400 nm or less, or 200 nm or less. With the second Si particle having such a large average particle size, the capacity of the second and the third composite material can be easily increased. Meanwhile, with an average particle size of 500 nm or less, the volume change in the second and third Si particles during charge/discharge becomes relatively small, and structural stability of the second and third composite materials improves. Here, the average particle size of the second and third Si particles is a value of at least after initial charge.

The Si particles dispersed in the silicate phase and/or carbon phase are generally composed of a plurality of crystallites. Preferably, the Si particles have a crystallite size of, for example, 30 nm or less. In this case, the volume change due to expansion and contraction of the Si particles involved with charge/discharge can be minimized, and therefore cycle characteristics can be further improved. For example, isolation of the Si particles due to losing contact points between the Si particles and surroundings due to voids formed around the Si particles when the Si particles contract, and reduction in charge/discharge efficiency is suppressed. The lower limit value of the crystallite size of the Si particles is not particularly limited, and for example, 5 nm or more. The crystallite size may be 10 nm or more and 30 nm or less, or 15 nm or more and 25 nm or less.

The second and third composite materials have an average particle size of, each independently, 1 to 20 μm, or 5 to 12 μm. With the above-described particle size range, the stress due to volume changes of the Si-containing material involved with charge/discharge can be easily relieved, and excellent cycle characteristics can be easily achieved.

The Si particle content of the Si-containing materials (composite materials) can be measured by Si-NMR. In the following, preferable Si-NMR measurement conditions are shown.

Measuring equipment: Solid-state nuclear magnetic resonance spectrometer (INOVA 400) manufactured by Varian Medical Systems
Probe: Varian 7 mm CPMAS-2
MAS: 4.2 kHz
MAS speed: 4 kHz
Pulse: DD (45° pulse+signal uptake time 1H decoupled)
Repetition time: 1200 sec
Observation width: 100 kHz
Observation center: near −100 ppm
Signal uptake time: 0.05 sec
Total number of times: 560
Sample volume: 207.6 mg The average particle size of the Si particles included in the Si-containing materials (composite materials) can be measured based on SEM (scanning electron microscope) of cross sections of the Si-containing material. Specifically, the average particle size of the Si particle can be determined by averaging the maximum particle size of randomly selected 100 Si particles.

The crystallite size of the Si particles is calculated based on the Sheller's equation from the half width of the diffraction peak assigned to the Si (111) plane of the X-ray diffraction (XRD) pattern of the silicon particles.

The average particle size of Si-containing materials (composite materials) means a particle size (volume average particle size) having a volume integrated value of 50% in the particle size distribution measured by the laser diffraction scattering method. For example, "LA-750" manufactured by Horiba Corporation can be used as the measuring device.

The composition of the second composite material can be analyzed, for example, by the following method.

The battery is disassembled, the negative electrode is taken out and washed with a nonaqueous solvent such as ethylene carbonate; after dried, the cross sections of the negative electrode mixture layer are processed with a cross section polisher (CP) to obtain a sample. A reflected electron image of a cross section of the sample is obtained by field emission scanning electron microscopy (FE-SEM), and the cross sections of the second composite material are observed. An Auger electron spectroscopy (AES) analyzer can be used to perform qualitative/quantitative analysis on the elements of the observed second composite material (acceleration voltage 10 kV, beam electric current 10 nA).

For example, in the case of a LSX represented by $Li_{2z}SiO_{2+z}$, the ratio of 2z to (2+z) can be determined from the obtained lithium (Li) content and oxygen (O) content.

In the above-described cross sectional observation and analysis of the sample, to prevent Li diffusion, a carbon stage can be used for fixing the sample. To not denature the sample cross section, a transfer-vessel which holds and transfers samples without exposing them to air can be used.

<Carbon Material as Negative Electrode Active Material>

The negative electrode mixture layer may include, as a negative electrode active material, a carbon material (hereinafter, also referred to as second carbon material). The second carbon material goes through expansion and contraction during charge/discharge to a lesser degree compared with the Si-containing material, and therefore by using it with the Si-containing material, cycle characteristics of the battery can be easily improved. The negative electrode active material may have a second carbon material content of, for example, 70 mass % or more and 99 mass % or less, 85 mass % or more and 99 mass % or less, or 90 mass % or more and 95 mass % or less. This easily allows for both a higher capacity and more excellent cycle characteristics.

Examples of the second carbon material include graphite, soft carbon, hard carbon, and the like. Preferred among them is graphite, which is excellent in stability in charge/discharge and has small irreversible capacity. Graphite means a material having a graphite type crystal structure, and includes, for example, natural graphite, artificial graphite, graphitized mesophase carbon particles, and the like. A kind of second carbon material may be used singly, or two or more kinds thereof may be used in combination.

The carbon phase, i.e., the lithium ion conductive phase of the third composite material, is not included in the second carbon material or in the first carbon material.

First Layer

In the following, the first layer is described in more detail. As is described, the first carbon material forming the first layer imparts electrical conductivity to the negative electrode active material, or it works to increase the electrical conductivity of the negative electrode active material and suppresses direct contact between the electrolyte and the negative electrode active material. Thus, the first layer may be selectively formed so as to cover those components with relatively poor electrical conductivity in the negative electrode active material, or those components that tend to induce side reactions with electrolytes in the negative electrode active material. For example, when the Si-containing material is used in combination with the second carbon material as the negative electrode active material, at least a portion of a surface of the Si-containing material which tends to induce side reactions with electrolytes can be covered with the first layer selectively, and the step of forming the first layer on the surface of the second carbon material can be omitted.

Of the Si-containing materials, the lithium ion conductive phase of the first composite material ($SiO_x$) and the second composite material (LSX and the like) have poor electron conductivity, and therefore it is preferable to form the first layer having electrical conductivity on the surface of the first composite material and second composite material.

A suitable first layer thickness is, for example, 2 n or more and 100 nm or less, but it can be suitably adjusted according to the applications of the secondary battery, types of the negative electrode active material, and types and structures of the first carbon material. The first layer thickness can be measured by analyzing the cross sections of the negative electrode active material on which the first layer is formed by, cross sectional SEM (scanning electron microscope) images, or TEM-EELS. The first layer thickness is measured at randomly selected 3 points, and averaging the obtained values.

The first layer forming method is not particularly limited. For example, it can be formed by mixing the target negative electrode active material, i.e., the negative electrode active material on which the first layer is to be formed, and a raw material of the first carbon material; and baking the obtained mixture at a high temperature in an inert atmosphere to carbonize the raw material of the first carbon material. When the baked product is coagulated, it can be suitably ground to be adjusted to have a desired particle size distribution using a sieve. Examples of the raw material of the first carbon material include pitch, tar, organic polymer, and the like. The first layer can also be formed by gas phase methods such as chemical vapor deposition (CVD), vacuum deposition, and the like. The first carbon material can be mixed with the target negative electrode active material on which the first layer is to be formed using a mixer in which a media is used, such as a ball mill.

Second Layer

In the following, the second layer is described in more detail. As described above, the second layer works to suppress side reactions between the electrolyte and the negative electrode active material, and detachment of the first layer. The second layer is formed on the negative electrode active material having at least a first layer so as to cover at least a portion of the first layer.

Preferably, the negative electrode mixture layer has a silicone content of, for example, 0.01 mass % or more and 1 mass % or less, and 0.05 mass % or more and 0.5 mass % or less. In such a range, a sufficient amount of a low resistance second layer can be easily formed on the surface of the negative electrode active material.

Preferably, the thickness of the second layer is, for example, 2 nm or more and 20 nm or less, more preferably 5 nm or more and 10 nm or less. The second layer thickness can be measured by analyzing the cross sections of the negative electrode active material on which the second layer is formed by, cross sectional SEM (scanning electron microscope) images, or TEM-EELS. The second layer thickness is measured at randomly selected 3 points, and averaging the obtained values.

The second layer forming method is not particularly limited, and for example, the target negative electrode active material on which the second layer is to be formed (including negative electrode active material having at least a first layer) is allowed to contact with silicone. At this time, a silicone having a reactive functional group can be used as silicone, and the functional group present at the negative electrode active material or the first layer surface may be allowed to react with the reactive functional group to form a chemical bond. The target negative electrode active material on which the second layer is to be formed can be mixed with the raw material of silicone, and the raw material of silicone can be allowed to react in the obtained mixture to produce silicone. When the target negative electrode active material on which the second layer is to be formed is allowed to contact or to be mixed with silicone or a raw material thereof, instead of silicone or a raw material thereof, a solution of the silicone or a raw material thereof mixed with a solvent can be prepared, and the solution can be used. In this case, the solvent can be volatilized at a suitable timing.

The procedure of forming the second layer is not complicated as described above, and therefore the second layer can be formed on all of the negative electrode active material included in the negative electrode mixture layer. For example, after forming the negative electrode mixture layer, the negative electrode mixture layer can be subjected to a predetermined procedure, to non-selectively form the second layer on the entire negative electrode active material included in the negative electrode mixture layer.

Negative Electrode

In the following, the negative electrode is described in more detail. The negative electrode has, for example, a sheet-type negative electrode current collector, and a negative electrode mixture layer formed on the negative electrode current collector. The negative electrode mixture layer can be formed, for example, by applying a negative electrode slurry in which a negative electrode mixture including the negative electrode active material is dispersed in a dispersion medium on a surface of the negative electrode current collector and drying the slurry. The dried coating film may be rolled, if necessary. The negative electrode mixture layer may be formed on one surface of the negative electrode current collector, or on both surfaces thereof.

The negative electrode mixture can include, as an essential component, a negative electrode active material, and a binder, conductive assistant, thickener, and the like as optional components.

As the negative electrode current collector, a non-porous conductive substrate (metal foil, etc.), and a porous conductive substrate (mesh-body, net-body, punched sheet, etc.) are used. For the material of the negative electrode current collector, stainless steel, nickel, nickel alloy, copper, copper alloy or the like can be exemplified.

Examples of the binder include resin materials; fluorine resins, such as polytetrafluoroethylene and polyvinylidene fluoride (PVDF); polyolefin resins, such as polyethylene and polypropylene; polyamide resins, such as aramid resins; polyimide resins, such as polyimide and polyamideimide; acrylic resins, such as polyacrylic acid, methyl polyacrylate, and ethylene-acrylic acid copolymers; vinyl resins, such as polyacrylonitrile and polyvinyl acetate; polyvinylpyrrolidone; polyethersulfone; rubbery materials, such as styrene-butadiene copolymer rubber (SBR), and the like. A kind of binder may be used singly, or two or more kinds thereof may be used in combination.

As the conductive assistant, for example, carbon black such as acetylene black, carbon nanotube (hereinafter, also referred to as CNT), metal fiber, fluorinated carbon, metal powder, conductive whisker such as zinc oxide and potassium titanate, electrically conductive metal oxide such as titanium oxide, organic conductive material such as phenylene derivative, and the like can be exemplified. A kind of conductive assistant may be used singly, or two or more kinds thereof may be used in combination.

Of the conductive assistants, CNT is suitable as a conductive assistant to be used with the Si-containing material. CNT is fibrous, and therefore even if voids are formed around the Si-containing material when the charged and expended Si-containing material goes through contraction by discharging, it is effective for securing contact points between the Si-containing material and the carbon material.

In the following, an example of a method for producing a negative electrode is described.

(i) First, a negative electrode slurry in which a negative electrode mixture is dispersed in a dispersion medium is prepared. The negative electrode mixture includes a negative electrode active material having a first layer, the first layer covers at least a portion of a surface of the negative electrode active material, and the first layer includes a first carbon material. The negative electrode active material having a first layer is formed, as already described, by for example, mixing a target negative electrode active material on which the first layer is to be formed with a raw material of the first carbon material (pitch, etc.), and then baking the mixture at a high temperature in an inert atmosphere.

(ii) Then, the negative electrode slurry is applied on a negative electrode current collector, and the dispersion medium is volatilized to form a coating. The negative electrode slurry can be applied to the negative electrode current collector by any method without particular limitation. The dried coating after the dispersion medium is volatilized can be rolled. The rolling can be performed, after forming the second layer covering at least a portion of a surface of the first layer by the following procedures.

(iii) A solution including silicone (hereinafter, referred to as silicone solution) is prepared. The silicone solution can be produced by dissolving silicone in the solvent. The silicone solution has a silicone concentration of, for example, 0.5 to 10 mass %.

The weight-average molecular weight of the silicone (Mw) is, for example, 80 or more and 10000 or less, 80 or more and 1000 or less, 500 or more and 3000 or less, or 100 or more and 1000 or less. In such a range, a second layer that is stable against reversible elastic deformation and a low resistance can be easily formed on a surface of the negative electrode active material.

(iv) Then, the negative electrode mixture coating formed on the negative electrode current collector is allowed to contact the silicone solution. For example, the negative electrode mixture is immersed in the silicone solution along with the negative electrode current collector, and after taken out of the silicone solution, the solvent is volatilized. In this manner, at least a portion of a surface of the first layer is covered with the second layer including silicone. At this time, the second layer is formed not only on the negative electrode active material having a first layer, but also on the negative electrode active material having no first layer; but this is not a problem, and rather, effects of suppressing side reactions between the negative electrode active material having no first layer and the electrolyte can be expected.

Next, a secondary battery of the embodiment of the present disclosure is described. The secondary battery includes, for example, the above-described negative electrode, a positive electrode, and a nonaqueous electrolyte.

Positive Electrode

The positive electrode includes a positive electrode active material capable of electrochemically storing and releasing lithium ions. The positive electrode includes, for example, a positive electrode current collector, and a positive electrode mixture layer formed on the surface of the positive electrode current collector. The positive electrode mixture layer can be formed, for example, by applying a positive electrode slurry in which a positive electrode mixture is dispersed in a dispersion medium, on a surface of the positive electrode current collector, and drying the slurry. The dried coating film may be rolled, if necessary. The positive electrode mixture layer may be formed on one surface of the positive electrode current collector, or may be formed on both surfaces thereof. The positive electrode mixture may contain the positive electrode active material as an essential component, and may contain a binder and a conductive agent as optional components.

For the positive electrode active material, for example, a lithium-containing composite oxide can be used. For example. $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, $Li_2MPO_4F$ (M is at least one selected from the group consisting of Na. Mg. Sc, Y, Mn, Fe, Co, Ni, Cu, Zn, Al, Cr, Pb, Sb, and B) is used. Here, a=0 to 1.2, b=0 to 0.9, and c=2.0 to 2.3. Note that the value "a" indicating the molar ratio of lithium is increased or decreased by charge/discharge.

In particular, a lithium nickel composite oxide represented by $Li_aNi_bM_{1-b}O_2$ (M is at least one selected from the group consisting of Mn, Co, and Al, $0<a\leq1.2$, and $0.3\leq b\leq1$) is preferable. In view of increasing the capacity, it is more preferable to satisfy $0.85\leq b\leq1$. In view of stability of the crystal structure, $Li_aNi_bCo_cAl_dO_2$ ($0<a\leq1.2$, $0.85\leq b<1$, $0<c\leq0.15$, $0<d\leq0.1$, $b+c+d=1$) including Co and Al as M is more preferable.

As the binder and the conductive agent, those exemplified for the negative electrode can be used. As the conductive agent, graphite such as natural graphite or artificial graphite may be used.

The shape and thickness of the positive electrode current collector can be selected from the shapes and ranges according to the negative electrode current collector. Examples of the material for the positive electrode current collector include stainless steel, aluminum, aluminum alloy, titanium or the like.

Electrolyte

The electrolyte includes a solvent and an electrolytic salt. For the solvent, a nonaqueous solvent can be used, or water can be used. When producing a lithium ion secondary battery, i.e., a representative example of nonaqueous electrolyte secondary batteries, the electrolytic salt includes at least a lithium salt.

Preferably, the electrolyte has a lithium salt concentration of, for example, 0.5 mol/L or more and 2 mol/L or less. By adjusting the lithium salt concentration within the above-described range, an electrolyte with excellent ion conductivity and suitable viscosity can be produced. However, the lithium salt concentration is not limited to the above-described concentration.

As the nonaqueous solvent, for example, a cyclic carbonate, a chain carbonate, a cyclic carboxylate, a chain carboxylate, or the like is used. Examples of the cyclic carbonate include propylene carbonate (PC), ethylene carbonate (EC), and the like. Examples of the chain carbonate include diethyl carbonate (DEC), ethyl methyl carbonate (EMC), dimethyl carbonate (DMC), and the like. Examples of the cyclic carboxylate include γ-butyrolactone (GBL) and γ-valerolactone (GVL). Examples of the chain carboxylate include methyl formate, ethyl formate, propyl formate, methyl acetate, ethyl acetate, propyl acetate, methyl propionate, ethyl propionate, and propyl propionate. A kind of nonaqueous solvent may be used singly, or two or more kinds thereof may be used in combination.

Examples of the lithium salt include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylates, LiCl, LiBr, LiI, borates, and imide salts. Examples of the borates include bis(1,2-benzenediolate (2-)-O,O') lithium borate, bis(2,3-naphthalenediolate (2-)-O,O') lithium borate, bis(2,2'-biphenyldiolate (2-)-O,O') lithium borate, and bis (5-fluoro-2-olate-1-benzenesulfonic acid-O,O') lithium borate. Examples of the imide salts include bisfluorosulfonyl imide lithium ($LiN(FSO_2)_2$; also referred to as LFSI in the following), bistrifluoromethane sulfonyl imide lithium ($LiN(CF_3SO_2)_2$), trifluoromethane sulfonyl nonafluorobutane sulfonyl imide lithium ($LiN(CF_3SO_2)(C_4F_9SO_2)$), bispentafluoroethane sulfonyl imide lithium ($LiN(C_2F_5SO_2)_2$), and the like. In particular, at least one of $LiPF_6$ and LFSI is preferable. A kind of lithium salt may be used singly, or two or more kinds thereof may be used in combination.

Separator

Usually, it is desirable to interpose a separator between the positive electrode and the negative electrode. The separator has excellent ion permeability and suitable mechanical strength and electrically insulating properties. The separator may be, for example, a microporous thin film, a woven fabric, or a nonwoven fabric. The separator is preferably made of, for example, polyolefin such as polypropylene and polyethylene.

The structure of the secondary battery can be, for example, a structure in which an electrode group and an electrolyte are accommodated in an outer case: the electrode group is formed by winding a positive electrode and a negative electrode with a separator interposed therebetween. Other forms of electrode groups may be applied, such as a laminated electrode group in which the positive electrode and the negative electrode are laminated with a separator interposed therebetween. The secondary battery can be any form, for example, a cylindrical, prism, coin-shaped, button-shaped, sheet-shaped, and laminated form.

Figure 1B:
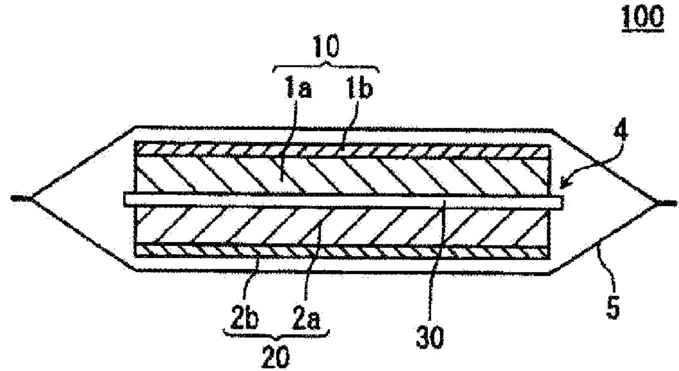
FIG. 1B is a cross sectional view along line X-X' of the nonaqueous secondary battery shown in FIG. 1A.

In the following, with reference to FIG. 1A and FIG. 1B, a nonaqueous electrolyte secondary battery of an embodiment of the present disclosure is described. FIG. 1A is a partially cutaway plan view schematically showing an example of a structure of a nonaqueous electrolyte secondary battery. FIG. 1B is a cross sectional view along line X-X' of FIG. 1A.

As shown in FIG. 1A and FIG. 1B, a nonaqueous electrolyte secondary battery 100 is a sheet type battery, and includes an electrode plate group 4, and an outer case 5 accommodating the electrode plate group 4.

The electrode plate group 4 has a structure in which a positive electrode 10, a separator 30, and a negative electrode 20 are stacked in this order, and the positive electrode 10 and the negative electrode 20 face each other with the separator 30 interposed therebetween. The electrode plate group 4 is formed in this manner. The electrode plate group 4 is impregnated with a nonaqueous electrolyte.

The positive electrode 10 includes a positive electrode active material layer 1*a* and a positive electrode current collector 1*b*. The positive electrode active material layer 1*a* is formed on the surface of the positive electrode current collector 1*b*.

The negative electrode 20 includes a negative electrode mixture layer 2*a* and a negative electrode current collector 2*b*. The negative electrode mixture layer 2*a* is formed on the surface of the negative electrode current collector 2*b*.

A positive electrode tab lead 1*c* is connected to the positive electrode current collector 1*b*, and a negative electrode tab lead 2*c* is connected to the negative electrode current collector 2*b*. The positive electrode tab lead 1*c* and the negative electrode tab lead 2*c* each extends out of the outer case 5.

An insulating tab film 6 insulates the positive electrode tab lead 1*c* from the outer case 5, and the negative electrode tab lead 2*c* from the outer case 5.

The present disclosure will be described in detail below with reference to Examples and Comparative Examples. The present invention, however, is not limited to the following Examples.

Comparative Example 1

(1) Preparation of Negative Electrode

For the Si-containing material, $SiO_x$ (x=1) (first Si-containing material) with an average particle size of 5 μm is prepared. The $SiO_x$ includes a $SiO_2$ phase, and Si particles (first Si particle) dispersed in the $SiO_2$ phase. The $SiO_x$ had a Si particle content of 50 mass %. The Si particles had an average particle size of 20 nm.

A first layer including the first carbon material was formed on a surface of $SiO_x$. The amount of the first carbon material was set to 5 mass % relative to a total mass of the Si-containing material and the first carbon material. Specifically, $SiO_x$ was mixed with coal pitch, and the mixture is baked in an inert atmosphere at 800° C., and at least a portion of a surface of $SiO_x$ was covered with a first layer including the first carbon material. Afterwards, the $SiO_x$ having the first layer was ground, and adjusted to give an average particle size of 5 μm using a sieve.

A negative electrode slurry was prepared: the negative electrode slurry contained $SiO_x$ having the first layer, acetylene black, and polyacrylamide at a mass ratio of 75:15:10 with water as a dispersion medium; thereafter, the negative electrode slurry is applied to one side of an electrolytic copper foil as the negative electrode current collector; the coating was dried, and then rolled; thereby producing a negative electrode sheet in which a negative electrode mixture layer is formed on one side of the negative electrode current collector.

Figures 2A, 2B, 2C:
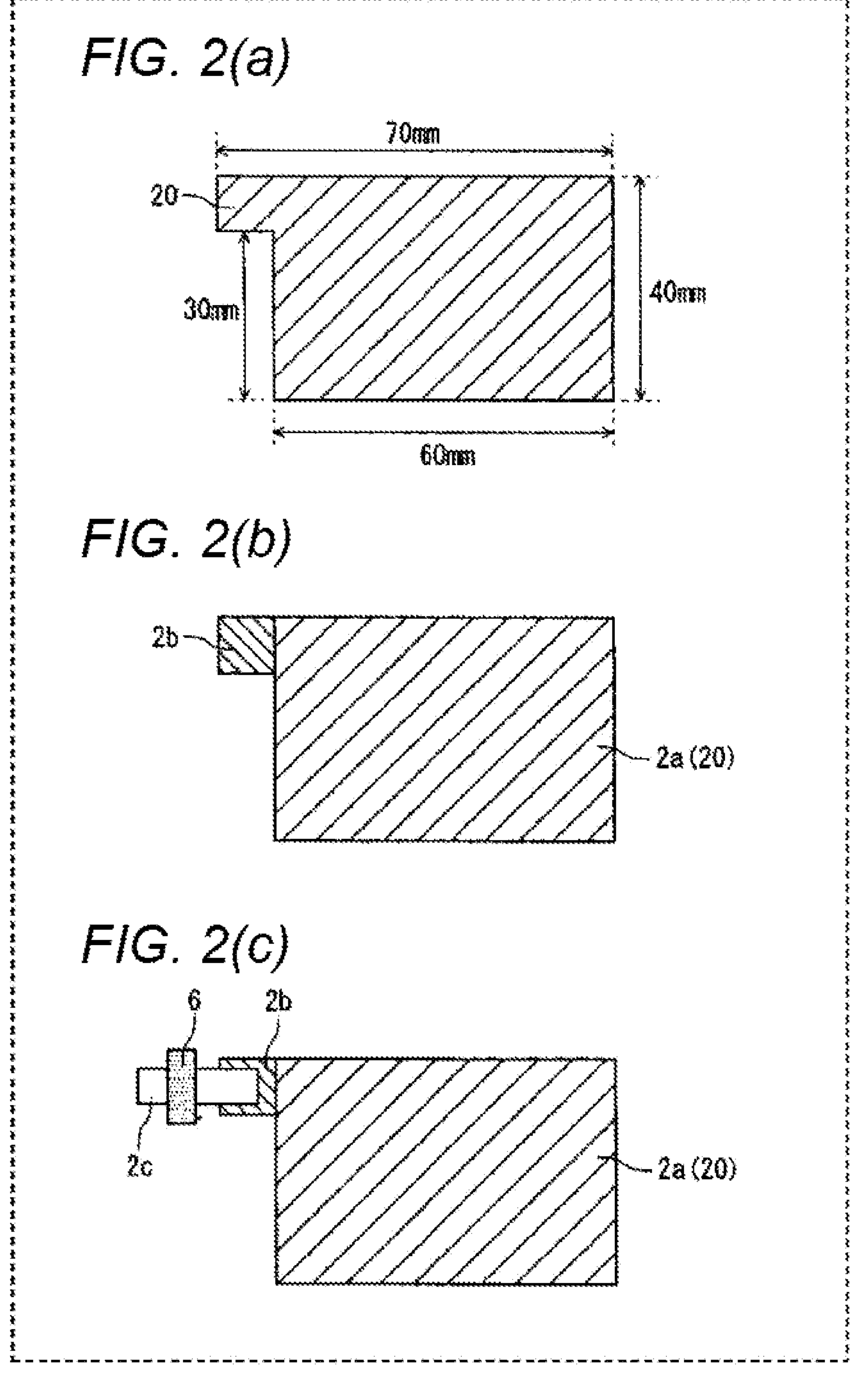
FIG. 2 (*a*) to FIG. 2 (*c*) illustrate a production method of a negative electrode for performance evaluation.

The negative electrode sheet was cut out to a shape in FIG. 2 (*a*), thereby producing a negative electrode 20 for evaluation. In FIG. 2 (*a*), the region of 60 nm×40 mm is a region to function as a negative electrode, and the protrusion region of 10 mm×10 mm is a region that connects with the tab lead 2*c*. Thereafter, as shown in FIG. 2 (*b*), the negative electrode mixture layer 2*a* formed on the above-described connecting region was scraped to expose the negative electrode current collector 2*b*. Thereafter, as shown in FIG. 2 (*c*), the exposed part of the negative electrode current collector 2*b* was connected to the negative electrode tab lead 2*c* and a predetermined region of the outer periphery of the negative electrode tab lead 2*c* was covered with an insulating tab film 6.

(2) Preparation of Counter Electrode

Lithium metal foil was attached to one side of the electrolytic copper foil (current collector), thereby producing a counter electrode sheet.

The counter electrode sheet was cut out to the same shape as that of the negative electrode, and the lithium metal foil formed on the connecting region formed in the same manner as the negative electrode was scraped off to expose the current collector. Thereafter, the exposed part of the current collector was connected to the tab lead in the same manner as the negative electrode, and a predetermined region of the outer periphery of the tab lead was covered with an insulating tab film.

(3) Preparation of Nonaqueous Electrolyte

A nonaqueous electrolyte was prepared by dissolving $LiPF_6$ in a solvent mixture of fluoroethylene carbonate (FEC) and dimethyl carbonate (DMC) (volume ratio 20:80) at a concentration of 1 mol/L.

(4) Preparation of Cell for Evaluation

Using the negative electrode for evaluation and the counter electrode as described above, a cell with a designed capacity of 114 mAh, which is regulated by the negative electrode, was produced. First, the negative electrode and counter electrode were allowed to face each other with two sheets of polyethylene made separator (thickness 15 μm) having an aramid coating interposed so that the negative electrode mixture layer overlaps with the lithium metal foil, thereby producing an electrode plate group. Next, an Al laminate film (thickness 100 μm) cut into a rectangular shape was folded in half, and longitudinal ends were heat-sealed at 230° C. to form an envelope. Afterwards, the fabricated electrode plate group was put into the envelope from one of short sides, and heat-sealing at 230° C. was performed, aligning the position of the thermal welding resin of respective tab leads with the end face of the Al laminate film. Next, 1.2 $cm^3$ of the nonaqueous electrolyte was injected from the not heat-sealed portion of the short side of the envelope, and after the injection, the following operation was carried out twice to impregnate the negative electrode mixture layer with the nonaqueous electrolyte; allowing it to stand for 3 minutes under a reduced pressure of 0.02 MPa, and returning it to an atmospheric pressure environment. Lastly, the end face of the injected side Al laminate film was heat-sealed at 230° C., thereby producing a cell B for evaluation of Comparative Example 1. The cell for evaluation was made in a dry air atmosphere at a dew point of −60° C. or less.

Examples 1 to 4

In the production of a negative electrode, the negative electrode slurry was applied to a surface of the negative electrode current collector, and the coating was dried and rolled; the dried coating was immersed in a predetermined silicone solution along with the negative electrode current collector, and thereafter, taken out from the silicone solution, and dried at 110° C. for 12 hours. At this time, a second layer including silicone was formed on the Si-containing material having the first layer through the first layer. Except for the above, a negative electrode was made in the same manner as in Comparative Example 1, thereby producing batteries A1 to A4 of Examples 1 to 4. For the silicone solution, the following silicone was dissolved in dimethyl carbonate (DMC) at a concentration of 2 mass %.

Example 1

Silicone A1: KR400 manufactured by Shin-Etsu Chemical Co., Ltd. (silicone oligomer having only a methyl group as a hydrophobic group)

Example 2

Silicone A2: KR300 manufactured by Shin-Etsu Chemical Co., Ltd. (silicone polymer having a methyl group and a phenyl group as hydrophobic groups)

Example 3

Silicone A3: KR311 manufactured by Shin-Etsu Chemical Co., Ltd. (silicone polymer having a methyl group and a phenyl group as hydrophobic groups)

Example 4

Silicone A4: KR112 manufactured by Shin-Etsu Chemical Co., Ltd. (silicone polymer having a methyl group as a hydrophobic group)

The TD ratio is, from the highest, in the order of silicone A1>A2>A3>A4. All had a polydimethylsiloxane skeleton as a main chain, and in silicone A2, A3, a portion of the methyl group is substituted with a phenyl group.

The batteries produced as described above are evaluated based on the following method.

Evaluation

The evaluation cell was sandwiched between a pair of 10×5 cm stainless steel (thickness 6 mm) plates and fixed under a pressure of 3.2 MPa.

First Cycle

In a thermostatic chamber at 25° C., the negative electrode was charged with lithium over 2 hours at a constant current of 0.05 C (1 C is a current value at which designed capacity is discharged by an hour), and the negative electrode was allowed to stand for 12 hours. The negative electrode was then charged further to a cell voltage of 0.01 V with a constant current of 0.05 C, and allowed to stand for 20 minutes. Lithium was then discharged from the negative electrode to a cell voltage of 1.5 V at a constant current of 0.05 C, and the cell was allowed to stand for 20 minutes.

Second to Third Cycles

The negative electrode was then charged with lithium to a cell voltage of 0.01 V with a constant current of 0.05 C, and allowed to stand for 20 minutes. Lithium was then discharged from the negative electrode to a cell voltage of 1.5 V at a constant current of 0.05 C. and the cell was allowed to stand for 20 minutes.

Fourth to 25th Cycles

The negative electrode was charged with lithium at a constant current of 0.3 C to a cell voltage of 0.01 V, and allowed to stand for 20 minutes, and thereafter, lithium was discharged from the negative electrode to a cell voltage of 1.5 V at a constant current of 0.3 C, and the cell was allowed to stand for 20 minutes: this cycle was repeated.

Figure 3:
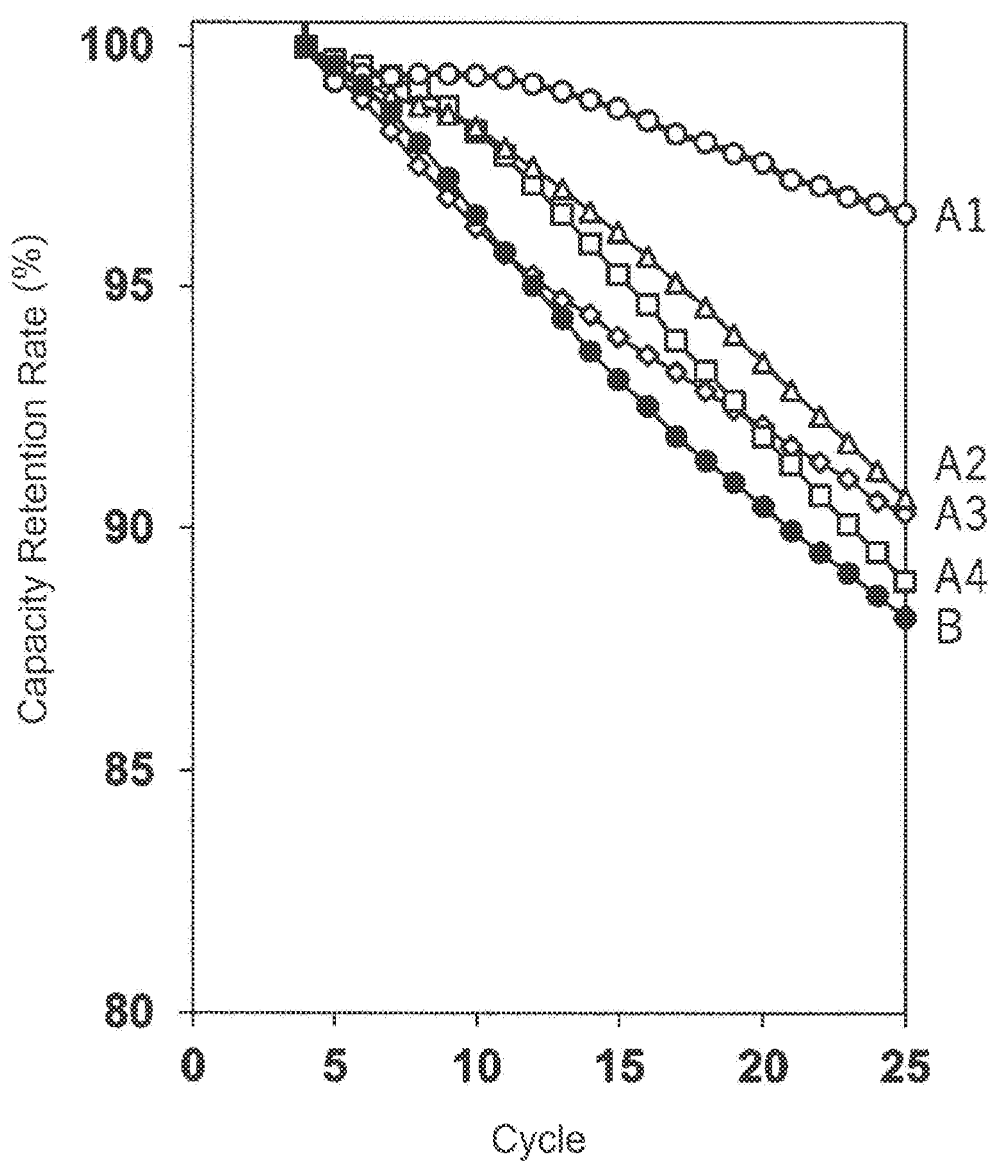
FIG. 3 shows a relation between the number of charge/discharge cycles and capacity retention rate of a secondary battery: A1 to A4 corresponding to Examples 1 to 4, and B1 corresponding to Comparative Example 1.

The charge/discharge were conducted under an environment of 25° C. FIG. 3 shows changes in capacity retention rate to the 25th cycle, setting the initial discharge capacity as 100%.

(1/X) It shows an electric current, (1/X) It (A)=rated capacity (Ah)/X(h), X shows time it took to charge or discharge electricity corresponding to the rated capacity. For example, 0.5 It means X=2, and the electric current value is rated capacity (Ah)/2(h).

FIG. 3 shows that the batteries A1 to A4 of Examples 1 to 4, in which the second layer including silicone as the Si-containing material is formed achieved excellent cycle characteristics compared with the battery B of Comparative Example 1, in which the second layer was not formed. Also, with a larger T/D ratio, excellent capacity retention rate was achieved.

Figure 4A:
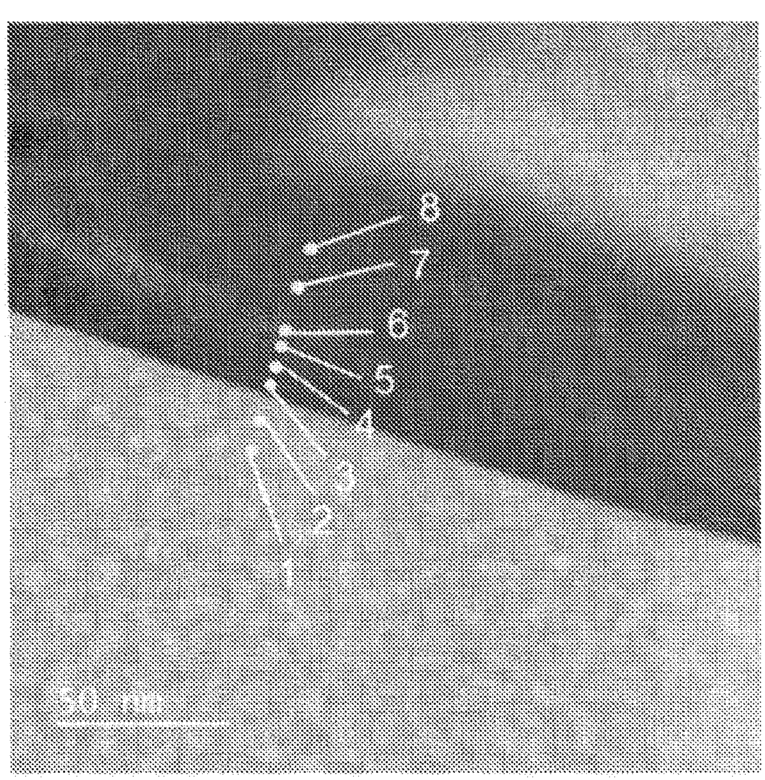
FIG. 4A is a TEM image of a cross section of a Si-containing material of the negative electrode used in a battery A4 of Example 1.
Figure 4B:
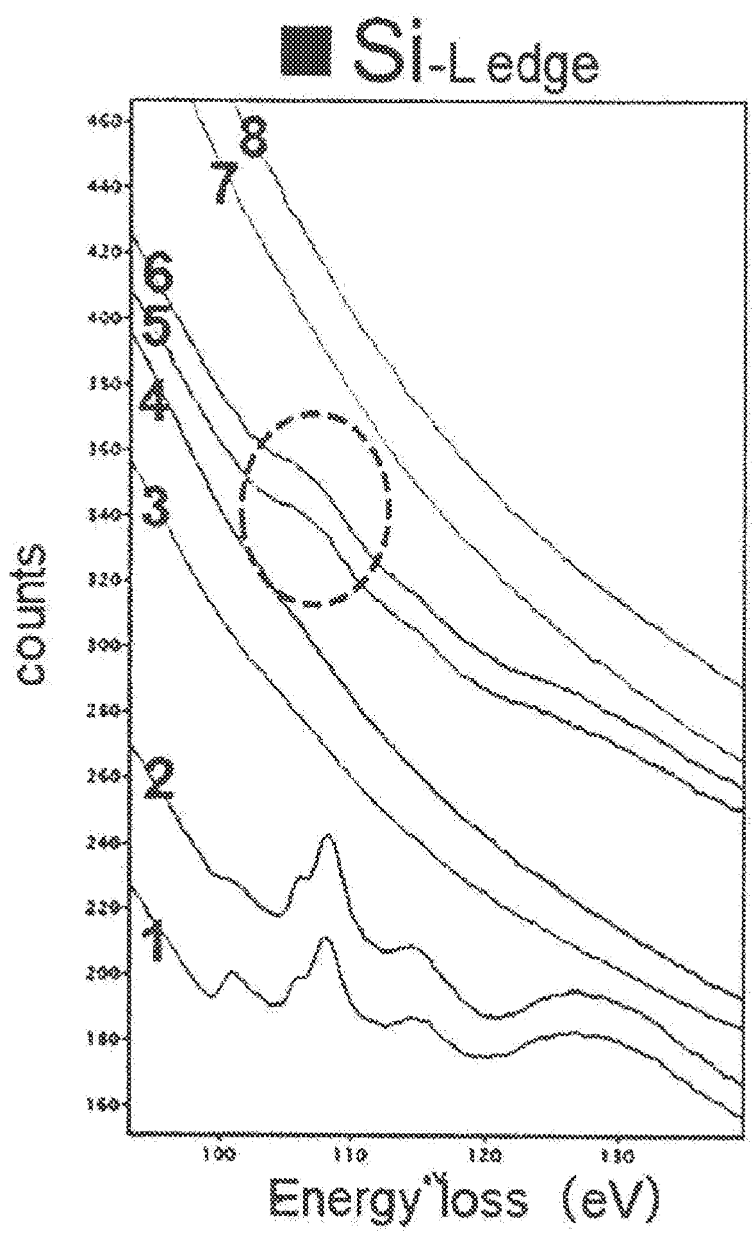
FIG. 4B shows a Si-L edge spectrum in TEM-EELS analysis.
Figure 4C:
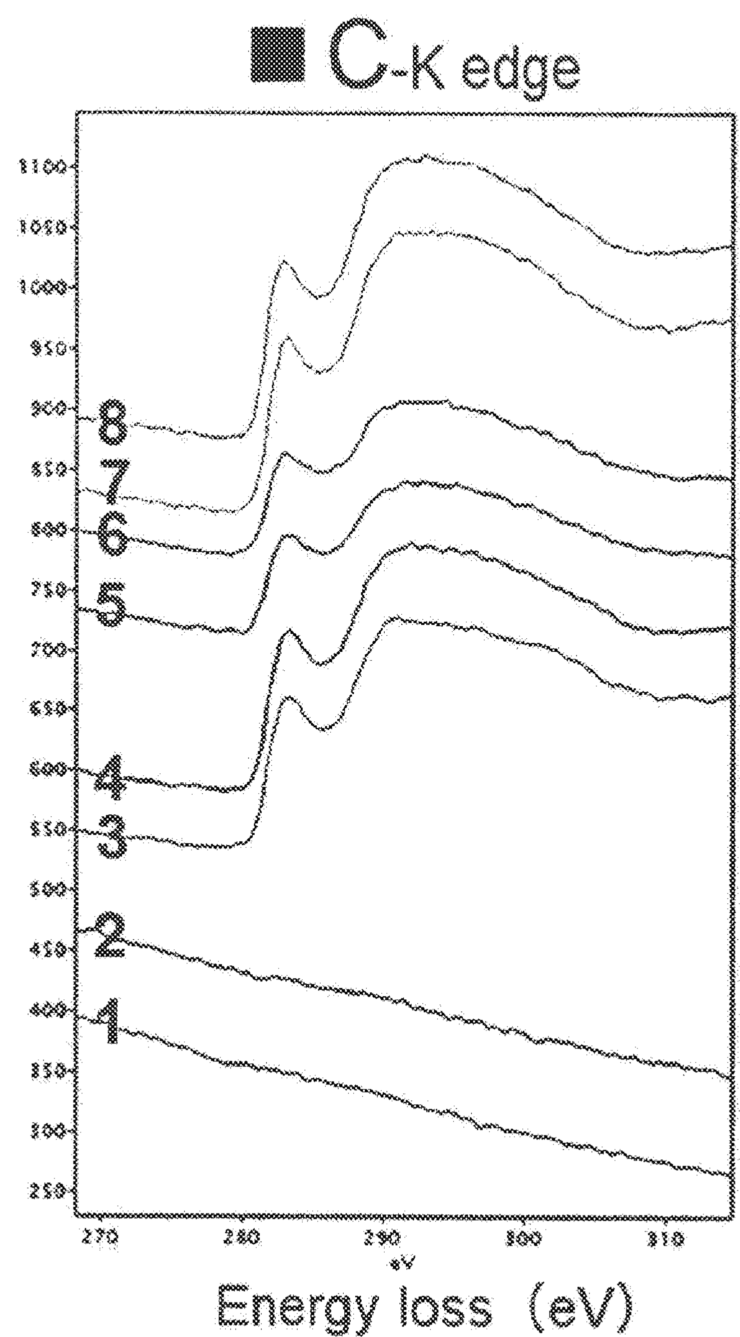
FIG. 4C shows a C-K edge spectrum in TEM-EELS analysis.
Figure 4D:
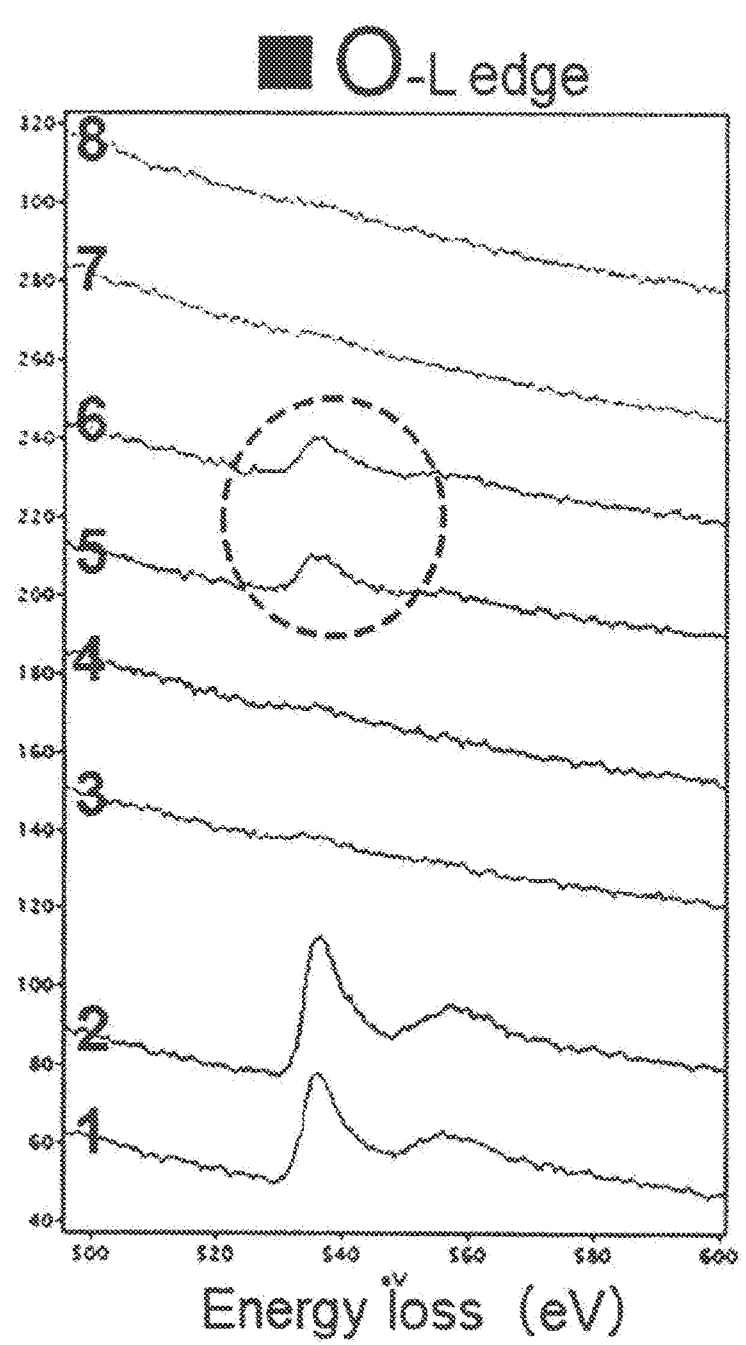
FIG. 4D shows a O-L edge spectrum in TEM-EELS analysis.

FIG. 4A shows SEM images of cross sections of the Si-containing material included in the negative electrode used in the battery A4 of Example 1. FIG. 4B to FIG. 4D show results of TEM-EELS analysis for the regions 1 to 8 shown in FIG. 3A. FIG. 4B shows a Si-L edge spectrum, FIG. 4C shows a C-K edge spectrum, and FIG. 4D shows O-L edge spectrum. In FIGs., the region shown with numbers 1 and 2 is the Si-containing material ($SiO_x$), and the region shown with the numbers 3 and 4 is the first carbon material forming the first layer, and the region shown with the numbers 5 and 6 is the region including silicone. FIGs, show that the first layer including the first carbon material and the second layer including silicone are formed on the surface of the Si-containing material. The first layer had a thickness of about 20 nm, and the second layer had a thickness of about 5 nm.

INDUSTRIAL APPLICABILITY

The negative electrode for a secondary battery according to the present disclosure is useful for a main power source of a mobile communication device, a portable electronic device, or the like, which is required to have a high capacity.

REFERENCE SIGNS LIST

1*a* Positive electrode active material layer
1*b* Positive electrode current collector
1*c* Positive Electrode Tab Lead
2*a* Negative Electrode Mixture Layer
2*b* Negative Electrode Current Collector
2*c* Negative Electrode Tab Lead
4 Electrode plate group
5 Outer Case
6 Insulating Tab Film
10 Positive Electrode
20 Negative Electrode
30 Separator
100 Nonaqueous electrolyte secondary battery

The invention claimed is:

1. A negative electrode for a secondary battery comprising a negative electrode mixture layer having a negative electrode active material, a first layer covering at least a portion of a surface of the negative electrode active material, and a second layer covering at least a portion of a surface of the first layer, wherein the first layer includes a carbon material,
the second layer includes silicone,
wherein the silicone is represented by $\{(R)_a SiO_{(4-a)/2}\}_c$, where
R is a substituted or non-substituted organic group having 1 to 8 carbon atoms,
"a" is a rational number satisfying 0≤a≤2, and
"c" is an integer satisfying 1≤c, and
a T/D ratio expressed by $RSiO_3$ unit/$R_2SiO_2$ unit is 0.15 or more.

2. The negative electrode for the secondary battery of claim 1, wherein the negative electrode active material includes a Si-containing material.

3. The negative electrode for the secondary battery of claim 2, wherein the Si-containing material includes a lithium ion conductive phase and Si particles dispersed in the lithium ion conductive phase, and the lithium ion conductive phase is at least one selected from the group consisting of a silicon oxide phase, a silicate phase, and a carbon phase.

4. The negative electrode for the secondary battery of claim 2, wherein a content of the Si-containing material in the negative electrode mixture layer is 1 mass % to 30 mass %.

5. The negative electrode for the secondary battery of claim 1, wherein the R is at least one selected from the group consisting of an alkyl group, a vinyl group, an alkoxy group, an aryl group, an aryloxy group, a ketone group, a carboxyl group, and an ester group.

6. The negative electrode for the secondary battery of claim 5, wherein the R is an alkyl group, and the alkyl group is at least one selected from the group consisting of a methyl group and an ethyl group.

7. The negative electrode for the secondary battery of claim 1, wherein the silicone has at least one selected from the group consisting of a silanol group and an alkoxysilyl group.

8. The negative electrode for the secondary battery of claim 1, wherein a thickness of the second layer is 2 nm or more and 20 nm or less.

9. The negative electrode for the secondary battery of claim 8, wherein the thickness of the second layer is 5 nm or more and 10 nm or less.

10. The negative electrode for the secondary battery of claim 1, wherein the silicone includes a crosslinked structure in which one silicon atom and two or more oxygen atoms are bonded.

11. A method for producing the negative electrode for the secondary battery of claim 1, the method comprising:

preparing a slurry including the negative electrode active material, the first layer covering at least a portion of a surface of the negative electrode active material, and a dispersion medium, wherein the first layer includes the carbon material,
applying the slurry on a negative electrode current collector, and volatilizing the dispersion medium, thereby forming a coating,
preparing a solution including the silicone and a solvent, and
allowing the coating to contact the solution and volatilizing the solvent, to cover at least a portion of a surface of the first layer with the second layer,
wherein the second layer includes the silicone.

12. The method for producing the negative electrode for the secondary battery of claim 11, wherein the weight-average molecular weight of the silicone is 80 or more and 10000 or less.

13. The method for producing the negative electrode for the secondary battery of claim 12, wherein the weight-average molecular weight of the silicone is 1000 or less.

14. A secondary battery comprising the negative electrode for the secondary battery of claim 1, a positive electrode, and an electrolyte.

* * * * *